United States Patent
Al-Omari et al.

(10) Patent No.: US 8,190,598 B2
(45) Date of Patent: May 29, 2012

(54) SKEW-BASED COSTING FOR DATABASE QUERIES

(75) Inventors: Awny K Al-Omari, Cedar Park, TX (US); Ramakumar Kosuru, Austin, TX (US); Renu Varshneya, Cupertino, CA (US); Robert L. Wall, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 12/261,058

(22) Filed: Oct. 30, 2008

(65) Prior Publication Data

US 2010/0114870 A1    May 6, 2010

(51) Int. Cl.
*G06F 17/30*    (2006.01)

(52) U.S. Cl. .................................................. 707/718
(58) Field of Classification Search .................. None
See application file for complete search history.

(56) References Cited

U.S. PATENT DOCUMENTS

| | | | |
|---|---|---|---|
| 2006/0218123 A1* | 9/2006 | Chowdhuri et al. | 707/2 |
| 2007/0174335 A1* | 7/2007 | Konig et al. | 707/104.1 |
| 2009/0132602 A1* | 5/2009 | Brown et al. | 707/200 |

* cited by examiner

*Primary Examiner* — Belinda Xue

(57) ABSTRACT

One embodiment is a method that determines skew to predict costs for query plans for a database query. The method selects a query plan that accounts for the skew to evenly distribute processing load among multiple processors and then executes the query with the selected query plan.

17 Claims, 3 Drawing Sheets

SKEW-BASED COSTING FOR DATABASE QUERIES

BACKGROUND

In Massively Parallel Processing (MPP) systems, Business Intelligence (BI) and Enterprise Data Warehouse (EDW) applications process massive amounts of data. The data (a set of relational tables) resides in very large database systems that rely on a large number of central processing units (CPU) to efficiently execute database operations. Operations are executed in parallel instead of being serially performing.

Balanced loading is a key to good performance in parallel processing architecture. MPP systems apply a divide-and-conquer approach of attempting to distribute evenly the data among the available processors to balance the overall processing load. This approach, however, does not account for skew which can significantly diminish effectiveness of parallel processing.

The accuracy of query plan costing used for optimizing the performance of parallel database operations is adversely affected by the presence of skew or by situations where a ratio of a number of distinct values to total number of parallel processors (D/P) is low. The effect of skew is to diminish the parallel processing. In fact, as parallelism is increased under these situations, the adversity of the effect actually increases and negatively affects scalability in increasing fashion.

DETAILED DESCRIPTION

Figure 1:
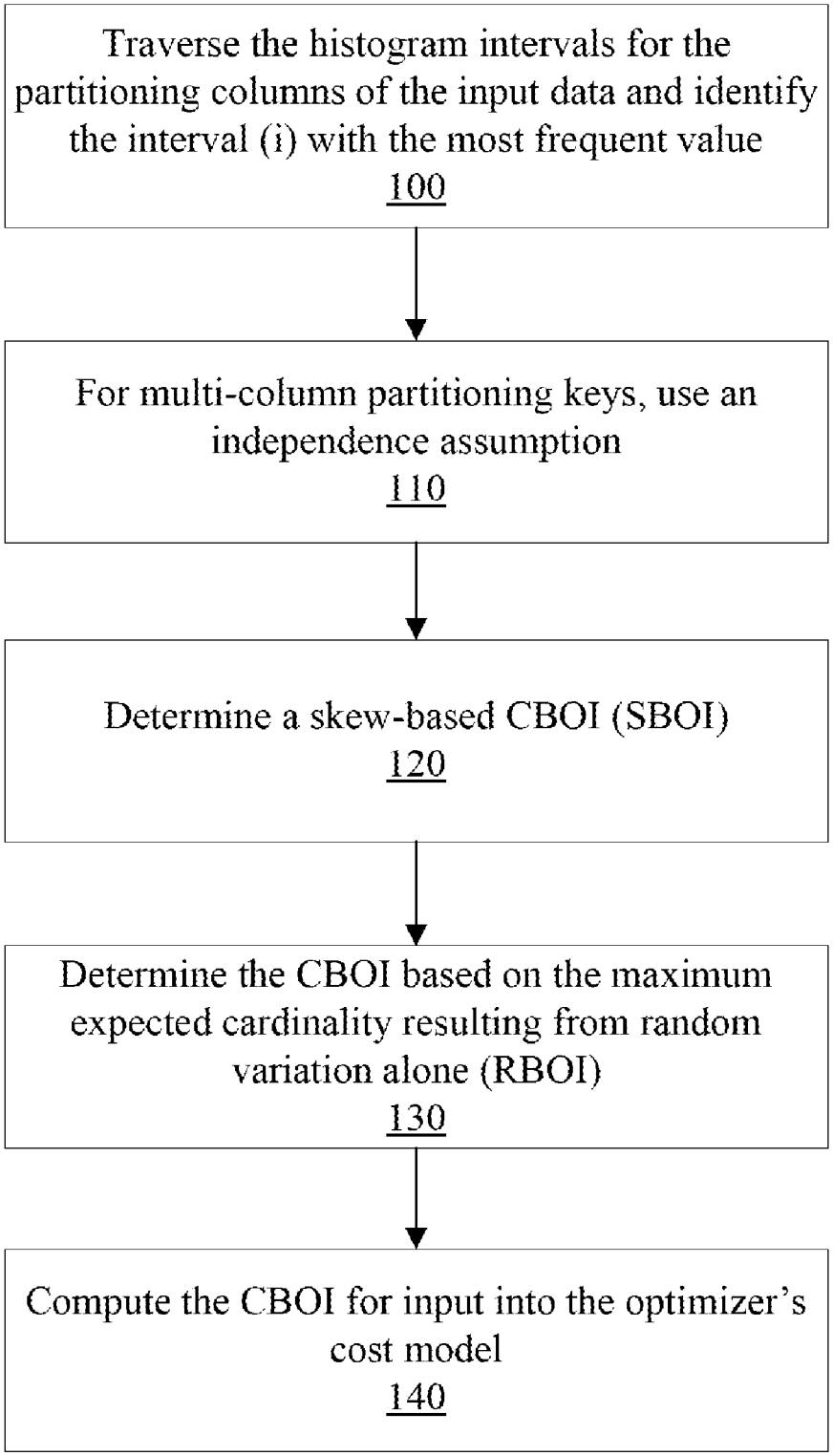
FIG. 1 is a flow diagram for providing an estimate of optimization costs for queries while taking into account the skew in the apportionment of work to the processors in accordance with an embodiment of the present invention.

Exemplary embodiments in accordance with the present invention are directed to systems and methods for using skew-aware optimization costing for database queries, such as Enterprise Data Warehouse (EDW) queries. Exemplary embodiments account for skew to generate accurate query plan costing for optimizing performance of parallel database operations. Exemplary embodiments also account for situations where a ratio of a number of distinct values to a total number of parallel processors (D/P) is low to provide accurate query plan costing.

One exemplary embodiment provides an estimate of the cardinality (i.e., number of participating records) of the busiest of the parallel processor streams. This estimate is used to penalize the query plan cost in a way that better accounts for any imbalance in the workload apportionment across plural processors. Exemplary embodiments provide a costing adjustment with query processing plans that are demonstrably more robust in the presence of skew or low D/P.

Optimum query response times for parallel database are highly correlated to the degree of uniformity achieved with the data load distribution process. According to Amdahl's law, the theoretical maximum speed up (Q) that can be achieved through parallelization is given by the following relationship:

$$\text{Max } Q \leq 1/(S+(1-S)/P); \text{ where } 0 \leq S \leq 1 \quad \text{(Equation 1)}.$$

Here P=number of processors and S=the fraction of the work that is ultimately accomplished serially.

For a balanced, perfectly uniform loading of the data (i.e., S=0) over P processors, equation 1 predicts Q to be at most linear in P (although the speed up could be super linear due to other effects such as from cache aggregation). As S approaches unity, Q converges to unity too implying no speed up from parallelization. So, notionally at least, S can be regarded as a parameter indicating the level of latent, data-driven, non-uniformity in processing.

Database management architectures use methods (e.g., hash partitioning) for allocating the data to different processors so that the resulting dataflow through a P-processor database management system is load-balanced throughout the duration of that operation. Partitioning techniques are value-based such that if the values along the partitioning column are not of uniform frequency, then the data load cannot be partitioned evenly across the P processors. In such cases, the column data are inherently "skewed." However, it should be realized also that even when the inherent skew is zero it is improbable for data partitioning processes to achieve a balanced, perfectly uniform load distribution, especially when the ratio of the number distinct values to total number of parallel processors (i.e., D/P) is low. Inherent skew and low D/P both work against value-based partitioning methods in achieving uniformity and, thus, lead to realized values of S that are greater than zero. This situation occurs because skew, from whatever source, will effectively increase the proportion of work that must be performed serially (i.e., S) or with fewer processors (P). The precise relationship between the degree of skew and an exact value of S is not required for exemplary embodiments. It is sufficient to realize that as skew increases, so does S, along with a more-than-proportional reduction in Q. Furthermore, it is noteworthy to also realize that the degree of loss of parallelism is worse for larger values of P such as found in modern BI and EDW database management architectures.

For BI and EDW applications, S is likely to be much greater than zero, due to nature of operational data that are re-organized for analysis: unique instances of attributes are often skewed in frequency or few in count. For example, a table can be partitioned across the parallel disk system on a unique (value) key such as Order_Number, which would distribute the data most uniformly, but the database operation on that table may use a different column such as Country_ID where, say, 30% of the orders have Country_ID valued as "United States". So, if the plan's associated join operation does not account for the imbalance in data flow, which can result if the cost model assumes uniformity, there will be a less than maximum speed up of the operation that could be gained through full data parallelization.

If S is not considered carefully in the process of costing query plans, the resulting load imbalances could lead to significant, sub-linear scalability and response times that are worse even than those achievable on database engines with far fewer processors. Comparative price-performance results under a TPC-DS (Transaction Processing Performance Council-Decision Support) workload will reflect this oversight. Skew-ignorant query plan optimizers are less effective than optimizers that are facilitated with skew-aware costing. Skew-aware costing is a fundamental step toward optimum data parallelism, especially for applications operating in the presence of data with high inherent skew and/or low D/P.

Exemplary embodiments provide query plan remedies to handle skew or low D/P. For example, for handling skew, one can replicate the smaller of two tables in a join to all processors to avoid repartitioning of the larger table on the skewed data column. For handling low D/P situations, one can "locally" consolidate a task to fewer processors to reduce messaging costs too excessive for the size job. In either case, it is preferable for optimum performance for the query plan optimizer to have a reliable method for sensing skew or low D/P situations in advance of costing alternative plans. Otherwise, such skew handling operations will not be considered in costing any of the plans. Therefore, for optimum scalability and query processing performance, query plan optimizers applied in the EDW and BI market space should be aware of the presence of skew in data participating in query operations. Skew situation "awareness" for query plan optimization costing is provided with exemplary embodiments.

Query optimizers include a pre-compile time mechanism to collect statistical synopses of selected column data for each table in the database. Through these synopses, data value distribution information is conveyed to the optimizer for making inferences about the expected cardinality (i.e., number of participating records) of any specific, predicate instantiated operator. Essentially, for each column of data, the values are sorted and grouped into a predetermined number of intervals whose boundary values are found using any of several alternative methods (e.g., equi-height or equi-depth, max-diff, v-optimal, etc.). Such methods attempt to set a sufficient or prescribed number of boundary values as precisely as is cost-wise practical so as to be able to estimate accurately the number of rows per interval. This is tantamount to applying a synopsis method that will minimize the stun squared errors of the actual value frequencies from the average interval approximation. Often distinct value counts are determined for each interval in order to better estimate the frequency per value over the range of each interval. For the very large tables that are common to many BI and EDW applications, the interval boundary values, row counts, and distinct value counts are estimated from samples of the column data with a resulting accuracy that is largely determined by the sample size and the amount of skew present in the data.

Traditionally, the level of this synopsis information has been insufficient for effectively directing remedial load balancing actions in the query planning stages (e.g., repartitioning the data on a join key when one or all of the join tables actually contain significant value skew or low D/P). Exemplary embodiments provide another variable that can be either added to the existing synopsis or derived at compile time, which has proven effective for skew costing adaptations. With this new information, the optimizer is able to identify the cardinality of the busiest operator instance (CBOI). From what has been discussed before, the CBOI will provide the best indicator of cost for the operation because the processor with the busiest operator will dominate the proportion of work allocated to P processors for parallel processing. With more representative costing, query execution planning results are more robust.

One exemplary embodiment provides for each interval (i) actual determinations or estimates (under sampling) of the row counts ($R_i$) and distinct value counts ($D_i$). Since the boundary values are random variables determined by an algorithm "reacting" to the random variation of the data values, one embodiment treats both $R_i$ and $D_i$ and their ratios, $R_i/D_i$, as random variables as well. So, X is defined as a random value with realizations $X_i = R_i/D_i$ for $i=1, 2, 3 \ldots, B$=number of bins (or intervals). It should be clear that $R_i \geq X_i \geq 1$ when an interval is populated and zero otherwise. For example, if $X_i$ equals 1 then all of the values in the interval are unique (i.e., with no repeats). However, as $X_i$ approaches $R_i$, X is providing an indication of possible value frequency skew in the $i^{th}$ interval when the values in that interval are allocated to processors.

One embodiment defines two more variables:

RF=(100%×frequency of the most frequent value/total row count)≈S (in Equation 1), and SF=maximum cardinality among operator instances (max C)/average operator instance cardinality (avg C).

The cardinality (C) of records expected to be processed by an operator instance is a significant input to operator-cost estimation. Most typically, under the assumption of uniformity:

Average(C)=cardinality of records to be processed/ number of processors.

The costing of an operator based on the average cardinality, however, will dramatically understate the true cost of the operation if significant skew exists. Consider the following example of processing 10 billion records (i.e., R=10 billion) with 128 partitions (i.e., P=128) and where 40% of the table records belong to one city (i.e., D=4 billion). Here is the SELECT statement:

SELECT city, sum ( . . . ) FROM calls WHERE . . . GROUP BY city.

The cardinality (C) of records expected to be processed by each GROUP BY operator instance under the assumption of uniformity is 10 billion/128=78 million records. However, in this situation, 40% (RF) of the work is performed by less than 1% (1/128) of the processors with the other 60% of the work being allocated to 128−1=127 processors. Note: SF=4 billion/78 million=51.2. So, by assuming no skew, the cost estimate is off by a factor of nearly 50.

One exemplary embodiment provides an estimate of the work and takes into account the skew in the apportionment of work to the processors. FIG. 1 is a flow diagram for providing an estimate of optimization costs for queries while taking into account the skew in the apportionment of work to the processors.

According to block 100, histogram intervals are traversed for the partitioning columns of the input data and the interval (i) is identified with the most frequent value, which is where the X is maximum. The frequency of the value with the maximum frequency (MF) will just be approximated as:

MF=maximum($r_i/d_i$); where $i=1, 2, 3 \ldots, B$ $r_i$=row count of the $i^{th}$ interval
$d_i$=distinct value count of the $i^{th}$ interval.

One exemplary embodiment collects the frequencies of the most frequent values of a column as part of the histogram information. The value of MF is then computed as simply the highest frequency among those of the frequent values.

According to block 110, for multi-column partitioning keys, in the absence of multi-column histograms or other correlation information, use the independence assumption such that:

MF($a,b,c \ldots k$)=MF($a$)*MF($b$)*MF($c$)* . . . *MF($k$).

According to block 120, determine a skew-based CBOI (SBOI) that depends on the number of partitions for the column. This method compensates query plan costs for cases where the inherent value skew is significant:

$$SBOI = MF + (R - MF)/P;\ where$$

P = total number of processors
R = total row count.

The equation for SBOI has two additive terms. MF is an estimate of the frequency of the most frequent value. The second term is an estimate of the average cardinality of the remaining values assigned to each processor. Added together, the two terms provide an estimate of the cardinality of the processor with the most work to accomplish.

According to block 130, using a simple regression model that is fitted offline, determine the CBOI based on the maximum expected cardinality resulting from random variation alone (RBOI). This method covers cases where D/P is low leading to noticeable statistical variation in the number of unique values assigned to each processor:

$$RBOI = (R/D)((D/P) + (\alpha_p \sqrt{D/P}));\ where$$

$\alpha_p$, a function of P alone, is pre-determined from a least squares prefit of Monte Carlo simulation results, where D and P were parametrically varied across their expected ranges.

According to block 140, compute the CBOI for input into the optimizer's cost model:

$$CBOI = maximum(SBOI, RBOI).$$

In one exemplary embodiment, this solution was thoroughly tested through simulation and analysis and found to be a very good approximation of the cardinality of the processor with the busiest operator. Moreover, all steps of the solution finished in O(1) time, very fast with no noticeable impact on query compile time.

In one exemplary embodiment, the model for determining RBOI in block 130 is a predictive model determined offline for any specific value-based partitioning algorithm supporting parallel database architecture. The form of the predictive model is $$K_P = (D/P) + (\alpha_p \sqrt{D/P}) + \epsilon.$$

Here, where up can be determined through simple curve fitting techniques that minimize the error $\epsilon$. $K_P$ is the extreme value above the expected ratio of D/P that is predicted to result from an unbiased, value-based partitioning process due to chance alone.

Figure 2:
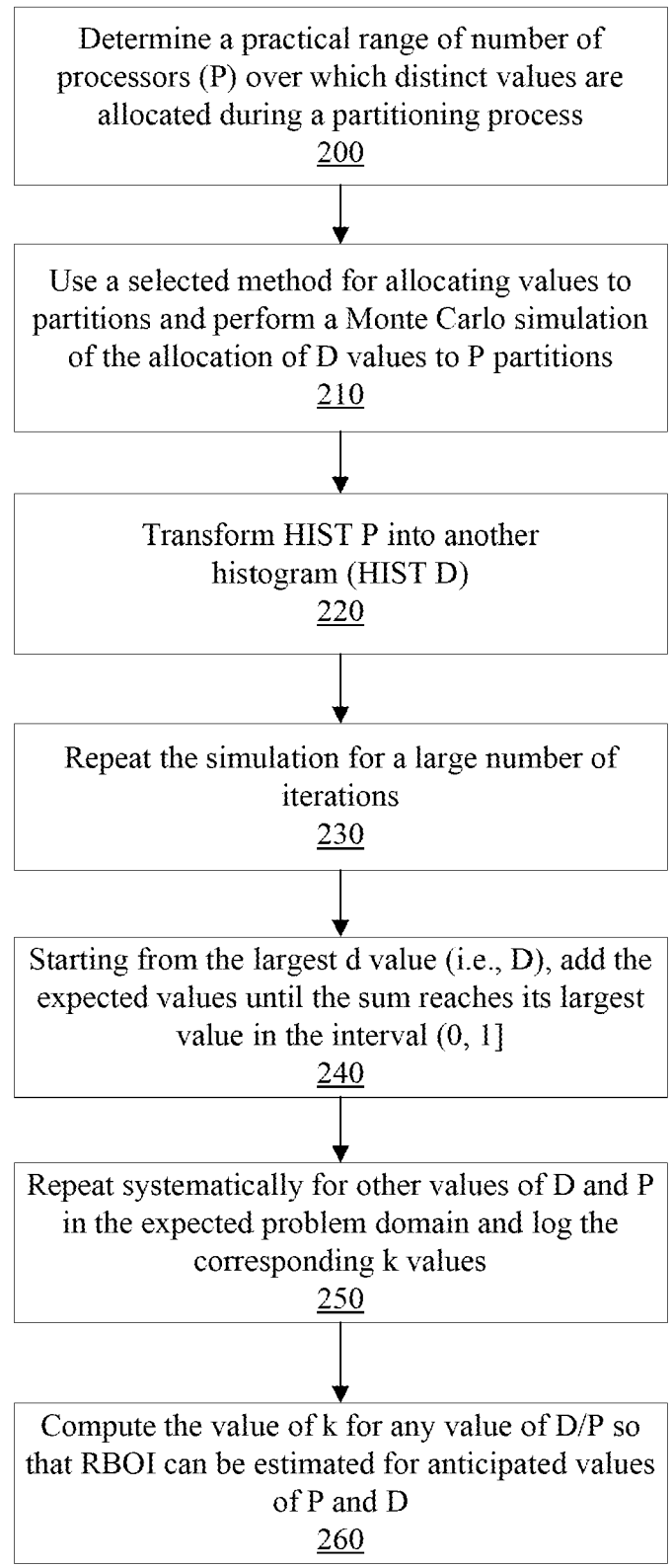
FIG. 2 is a flow diagram for determining a predictive model for a partitioning algorithm supporting parallel database architecture in accordance with an embodiment of the present invention.

FIG. 2 is a flow diagram for determining a predictive model for a partitioning algorithm supporting parallel database architecture in accordance with an embodiment of the present invention.

According to block 200, for the architecture of interest, determine a practical range of number of processor (P) over which distinct values are allocated during a partitioning process.

According to block 210, using a selected method for allocating values to partitions (e.g., hash), perform a Monte Carlo simulation of the allocation of D values to P partitions. Values going to partitions to be processed by the same logical processor are bucketed together. Collect results of this single iteration into a histogram (HIST P) describing the frequency of distinct values at each processor, such that the sum of these frequencies under HIST P is D. The degree of uniformity achieved even by a perfectly unbiased, random allocation process will not be perfectly uniform. There will be variations from the average allocation (i.e., D/P) due to chance alone, with the highest relative variation (e.g., as can be measured by the coefficient of variation) occurring in low D/P situations. It is the degree of this variation that is of interest to this solution.

According to block 220, transform HIST P into another histogram (HIST D) that now characterizes the number of processors having the same number of distinct values exactly equal to d, where d ranges between 0 and D inclusive. In this manner, HIST D conveys the number of processors receiving exactly d distinct values for this iteration, such that the sum of these frequencies is P.

According to block 230, for the same initial D and P parameter, go back to block 220 and repeat the simulation for a large number of iterations, say 1000, and average the results of HIST P into HIST D at the end of the simulation. In this manner, HIST D will convey the expected number of processors receiving exactly d distinct values, with the frequency sum still as P.

According to block 240, after completing all of the iterations of the Monte Carlo simulation, starting from the largest d value (i.e., D), add the expected values until the sum reaches its largest value in the interval (0, 1]. That is to say, k represents the least extreme value of d where the area of the histogram to the right of k is less than or equal to 1 (CPU). Log the value of d where this sum occurs as k. Correspondingly, one embodiment logs a value for k that will denote the lower bound on the maximum number of distinct values one CPU may get (i.e., RBOI) for any given D and P. The following figures respectively depict results for "high" and low D/P.

According to block 250, go back to block 210 and repeat systematically for other values of D and P in the expected problem domain and log the corresponding k values.

From simulations, one exemplary embodiment found that each processor has an h in P chance of being allocated exactly d distinct values, where h is the observed number of processors with exactly d distinct values from the Monte Carlo simulation. Whereas there is the largest chance (i.e., the mode) of a processor receiving D/P distinct values, there is only a 1 in P chance of seeing a value as large as k. However, after P trials, we do indeed expect to see at least one processor with k or more distinct values. From the simulation results, we can state with high probability that even when D=P or D/P=1, there will be, due to chance alone, a processor that will have nearly five times the number of distinct values allocated to it as are allocated the other processors on average (i.e. 1 distinct value). Also, as D/P decreases (increases), the distance of k from D/P grows (shrinks) and the allocation becomes less (more) uniform. This is indicative of why low-D/P situations present problems of accuracy for parallel costing algorithms that assume uniformity.

According to block 260, compute the value of k for any value of D/P so that RBOI can be estimated for anticipated values of P and D. Toward this end, the results of the Monte Carlo simulation is used to determine a simple, single parameter model for predicting k of the form: $K_P = (D/P) + (\alpha_p \sqrt{D/P}) + \epsilon.$ The prediction error from this model has been determined to be very low. So for a given D/P, we can determine a $K_P$ such that RBOI=$K_P$ representing the lower bound on the maximum number of distinct values allocated to a single CPU during a partitioning process due to chance alone.

The accuracy of query plan costing for operators in database operations can be significantly affected by the presence of value-frequency skew and/or low D/P. As shown above, the significance of the effect's adversity increases as the degree of parallelism increases. This can affect scalability negatively, because the theoretical potential for speed-up (i.e., as measured by Max. Q in Equation 1) diminishes with the rapid collapse of the parallelism-potential. Correspondingly, the slow-down factor can be estimated for any situation as SF. Exemplary embodiments provide for not only the detection of frequency skew and/or low D/P situations but also for the improvement of the inputs to query plan costing in the presence of such.

One embodiment includes the techniques for detecting and treating both conditions: value-frequency skew and low D/P. Skew due to high value-frequency is detected through the augmentation of typical histograms with the new descriptive statistic X. Correspondingly, MF, a direct function of X, is then used to determine SBOI. Using the series of steps prescribed for building the regression model for determining RBOI, skew potential due to the random effects found in low D/P situations is pre-computed for the specific P-processor architecture and specific algorithm used for distributing D values over P CPUs. This model provides the expected value for the lower bound of the maximum number of distinct values ($K_P$) allocated to any single CPU. The improved, skew aware cost estimate, CBOI, is determined by taking the maximum of SBOI and RBOI.

RF, the ratio of the frequency of the most frequent value to the total row count, can provide a surrogate measure of S in Equation 1 or the degree of expected skew behavior one might find in any particular workload. Therefore, one should be interested in approximate histogram construction algorithms and sampling rates that can provide the most accurate estimates for RF and MF, both based on X. It is stated without additional proof here that the so-called "end-biased" histograms may provide the best estimates, since these class histograms tend to isolate the N-highest frequency values into their own histogram intervals such that MF=$R_i$ for the bin holding the highest frequency value.

Exemplary embodiments provide an optimizer that is aware of the degrees of potential work imbalances that can accrue from data value skew. The idea is to be able to detect, in advance of query compilation and optimization, data value skew situations that can result in the collapse of data parallelism. By making use of common data distribution synopsis structures (e.g., histograms), derivative metrics can be delivered to parallel query optimizers that will assist in establishing more accurate plan costs based on the expected cardinality of the busiest operator instance. The promise of skew-aware optimizations is improved in performance, performance consistency, and scalability and, thus, more predictable in query run times for most typical BI and EDW applications.

The algorithm discussed above for deriving skew-awareness information from existing data synopsis structures (i.e., histograms constructed from the applied column data using the available Update Statistics application) was implemented on a massively parallel architecture. The implementation was tested against several validation cases, which represented different queries operating in similar high-skew situations. Three exemplary results are summarized below as Query 1, Query 2, and Query 3.

Query 1: Two tables are joined on a join-column that is highly skewed. The first table (F1) is a fact table with one billion rows, while the second table (D1) is a much smaller dimension table of sixteen million rows. The tables are partitioned on a 128 CPU shared nothing system. The join column from the fact table is skewed with the RF value being 20. Under the baseline case (i.e., no skew-aware optimization), the optimizer picked a reasonably good plan where the first, larger table was repartitioned on the join column. However, with new skew awareness information to exploit, the optimizer constructed a more efficient plan that broadcast the dimension table to each join instance eliminating repartitioning of the large fact table.

Query 2: For this case, tables F1 and D1 from the first example now participate in a nine way join with several other tables in a star schema. Like with the first example, this case is run with and without the skew-aware optimization.

Query 3: Using data from a telecommunication company customer, a group-by operation is attempted on column of highly skewed values with the RF value being 40. The billion row table is partitioned on a 64 CPU shared nothing CPU system. Like with the first and second examples, this query is run with and without the skew-aware optimization. Without this information the optimizer repartitions the data before the group-by operation. However, with the skew awareness information the optimizer is able to determine correctly that the query would perform better if the data are repartitioned after the partial group-by operation.

The following table summarizes the performance results for these three exemplary queries. The speed-up factor is a multiplicative factor:

| Case | Speed-Up Factor |
| --- | --- |
| Query 1 | 12.5 |
| Query 2 | 15.5 |
| Query 3 | 5 |

Figure 3:
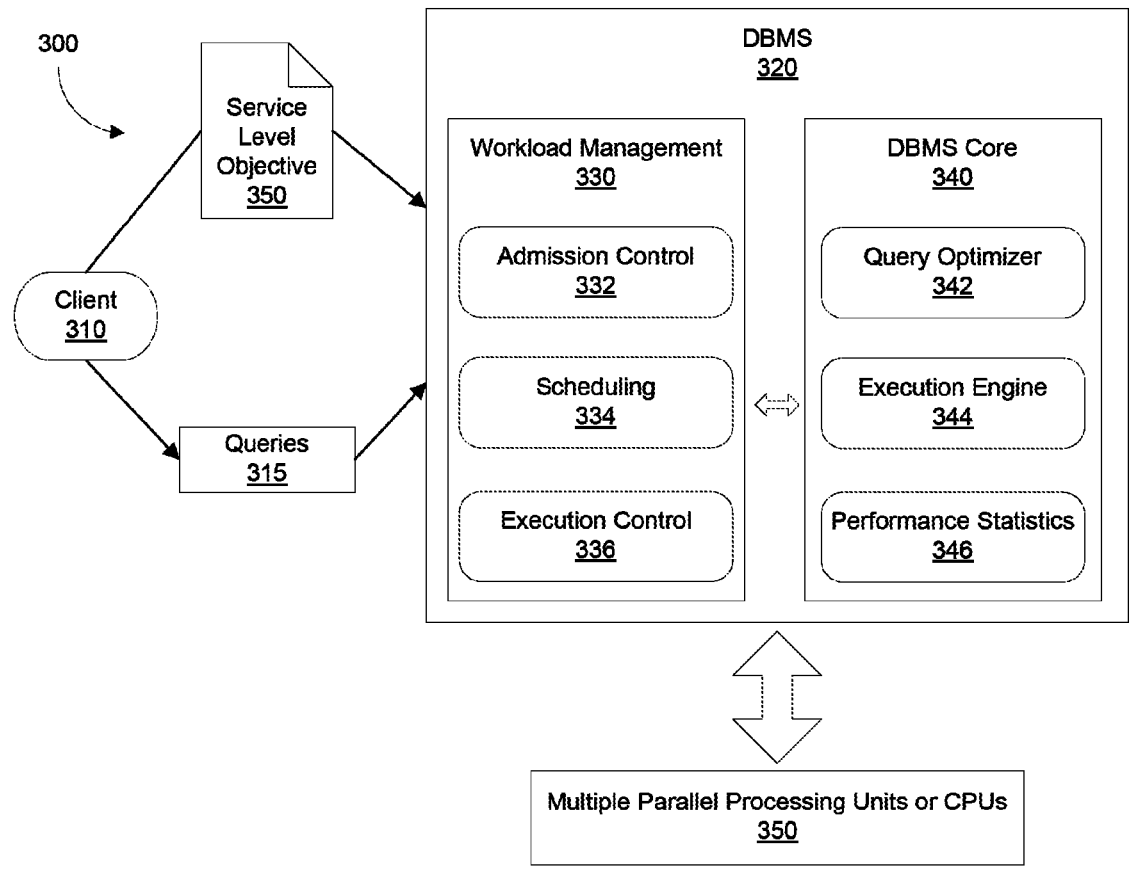
FIG. 3 is a database system for managing the execution of database queries in accordance with an exemplary embodiment of the present invention.

FIG. 3 is a database system 300 for managing the execution of database queries in accordance with an exemplary embodiment of the present invention. In one embodiment, the database system is a parallel processing system that simultaneously uses multiple processors executing in parallel to execute a query.

The system generally includes a computer or client 310 that sends queries 315 to a Database Management System (DBMS) 320 which includes a workload management component 330 and a DBMS core 340. The workload management component includes plural components or modules as admission control 332, scheduling 334, and execution control 336. The DBMS core 340 includes plural components or modules as a query optimizer 342, an execution engine 344, and performance statistics 346. Further, Service Level Objectives (SLOs) 350 are coupled between the client 310 and the DBMS 320.

The workload management architecture 330 provides fundamental workload management functionality for admission control, scheduling, and execution control. In one embodiment, each of these modules 332, 334, and 336 represents a knob that can be adjusted to select from a variety of workload management policies and algorithms.

The DBMS core 340 provides core database functionality and supply information to workload management components but does not implement workload management policies.

In one embodiment, the database system executes workloads that include one or more jobs. Each job consists of an ordered set of typed queries 315 submitted by a computer or client 310, and is associated with one or more Service Level Objectives (SLOs). Each query type maps to a tree of operators, and each operator in a tree maps in turn to its resource costs.

Policies of the admission control 332 determine the submission of queries 315 to the execution engine 344 that executes the submitted queries. The admission control 332 performs several functions in workload management. First, when a new job arrives, admission control 332 evaluates the DBMS's multiprogramming level, and either submits or enqueues each of the job's queries. Second, the architecture is configurable to support multiple admission queues. Policies of the admission control 332 regulate the distribution of queries among these queues, for example adding queries to queues based on estimated cost or dominant resource. Third, when the execution engine 344 has finished processing a query, admission control 332 selects the next query for execution.

Once queries have been enqueued, the policies of the scheduler 334 determine the ordering of the queries within a queue (for example, by estimated cost). Policies of the execution control 336 then govern the flow of the running system to multiple parallel processors or central processing units (CPUs) 350.

As queries execute, the execution control 336 uses runtime statistics to identify problems such as overload situations or queries that are unexpectedly long-running. The execution control 336 then invokes appropriate policies to address these problems. For each executing query, the execution control 336 can monitor various metrics, such as a number of cancellations (i.e., a count of a number of times an individual query is killed), progress (i.e., a ratio of monitored to expected work terms of resource utilization), resource contention (i.e., number of queries that are competing with a query for resources), and database time (i.e., time a query is executing in the database, as opposed to waiting in a queue).

Figure 4:
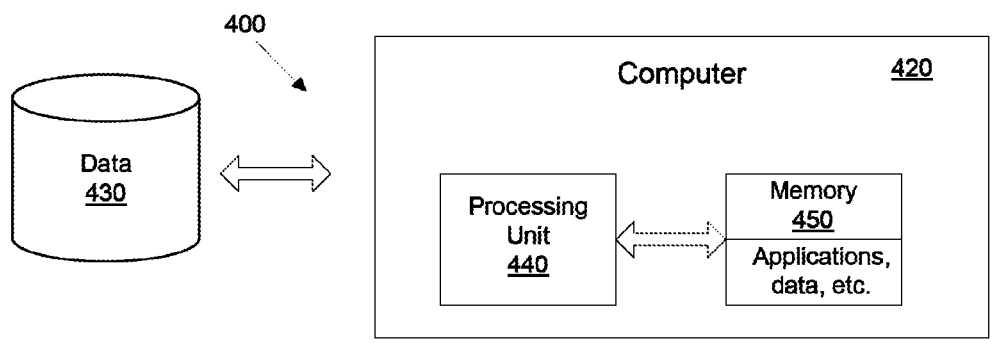
FIG. 4 is a block diagram of an exemplary computer system in accordance with an embodiment of the present invention.

Embodiments in accordance with the present invention are utilized in or include a variety of systems, methods, and apparatus. FIG. 4 illustrates an exemplary embodiment as a computer system 400 for being or utilizing one or more of the computers, methods, flow diagrams and or aspects of exemplary embodiments in accordance with the present invention.

The system 400 includes a computer system 420 (such as a host or client computer) and a repository, warehouse, or database 430. The computer system 420 comprises a processing unit 440 (such as one or more processors of central processing units, CPUs) for controlling the overall operation of memory 450 (such as random access memory (RAM) for temporary data storage and read only memory (ROM) for permanent data storage). The memory 450, for example, stores applications, data, control programs, algorithms (including diagrams and methods discussed herein), and other data associated with the computer system 420. The processing unit 440 communicates with memory 450 and data base 430 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

DEFINITIONS

As used herein and in the claims, the following words have the following definitions:

The terms "automated" or "automatically" (and like variations thereof) mean controlled operation of an apparatus, system, and/or process using computers and/or mechanical/electrical devices without the necessity of human intervention, observation, effort and/or decision.

The term "Amdahl's law" means a method to find a maximum expected improvement to an overall system when only part of the system is improved and is applied in parallel computing to predict a maximum up using multiple processors. The method models a relationship between expected speedup (i.e., how much a parallel algorithm is faster than a corresponding sequential algorithm) in a parallel processing implementation relative to a serial algorithm with an assumption that the problem size is the same once parallelized.

The term "Business Intelligence" or "BI" means technologies, applications, and practices for the collection, integration, analysis, and presentation of business information to improve business decision making.

The term "Enterprise Data Warehouse" or "enterprise-level data warehouse" or "EDW" means a storage or repository of an organizations' electronically stored data. The term may include means and methods to retrieve, analyze, extract, transform, manage, and load data into a data warehousing system or database.

A "database" is a structured collection of records or data that are stored in a computer system so that a computer program or person using a query language can consult it to retrieve records and/or answer queries. Records retrieved in response to queries provide information used to make decisions. Further, the actual collection of records is the database, whereas the DMS is the software that manages the database.

A "database management system" or "DBMS" is computer software designed to manage databases.

A "cardinality" of a set is a measure of a number of elements in the set.

The term "Monte Carlo" means a method or algorithm that relies on repeated random sampling to compute results. Generally, a domain of inputs is defined, inputs are randomly generated from the domain, a deterministic computation is performed on the inputs, and results of individual computations are aggregated.

The word "partitioning" or "partitioning key" in the context of database tables relates to the horizontal partitioning of the table rows. The two exemplary goals to achieve in partitioning are even distribution and collocation. Columns that have a high frequency of usage, high UEC (unique entry count, also known as cardinality), and low skew are good candidates for the partitioning key. On the other hand, it is desirable to collocate the data from different tables that will be joined together in order to minimize the number of messages passed between different central processing units (CPUs). In one embodiment, desirable properties for partitioning keys are high frequency of usage, high UEC, and low skew.

A "query" is a request for retrieval of information from a database.

A "query optimizer" is a component of a database management system (DBMS) that attempts to determine the most efficient way to execute a query. Query optimizers evaluate different possible query plans for a given input query and determine which of those plans is most efficient. Cost-based query optimizers assign an estimated "cost" to each possible query plan, and choose the plan with the smallest cost. Costs are used to estimate the runtime cost of evaluating the query, in terms of the number of I/O operations required, the CPU requirements, and other factors. The set of query plans examined is formed by examining the possible access paths (e.g. index scan, sequential scan) and join algorithms (e.g. sort-merge join, hash join, nested loops).

A "query plan" is a set of steps used to access information in database management system. For example, in an SQL database, multiple alternate ways with varying performance exist to execute a given query. When a query is submitted to the database, a query optimizer evaluates some of the different possible plans for executing the query and returns one or more possible results.

A word "table" when used in the context of a database is a logical representation of data in a database in which a set of records is represented as a sequence of rows, and the set of fields common to all the records is represented as a series of columns. The intersection of a row and column represents the data value of a particular field of a particular record.

A "schema" is a named collection of database objects (for example, tables, views and indexes). The schema describes the objects in the database and relationships among such objects.

The word "skew" means data load is not uniformly distributed or evenly partitioned across multiple parallel processors.

"Structured Query Language" or "SQL" is a database computer language designed for the retrieval and management of data in a relational database management system, database schema creation and modification, and database object access control management. SQL provides a programming language for querying and modifying data and managing databases (for example, retrieve, insert, update, and delete data, and perform management and administrative functions.

A "workload" is a set of queries used for the data warehouse.

In one exemplary embodiment, one or more blocks or steps discussed herein are automated. In other words, apparatus, systems, and methods occur automatically.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
considering skew to generate costs for query plans for executing a query in a database;
selecting a query plan to eliminate the skew so data load while executing the query is evenly distributed across multiple processors;
executing the query with the query plan with the multiple processors in a parallel processing system; and
traversing histogram intervals for partitioning columns of input data and identifying an interval with a most frequent value to consider the skew to generate the costs for the query plans.

2. The method of claim 1 further comprising, estimating a number of participating records in the database having a busiest parallel processing stream to penalize a query plan cost to account for imbalances in workload apportionment across the multiple processors.

3. The method of claim 1 further comprising, identifying a cardinality of a busiest operator instance to provide an indicator of cost for executing the query plans.

4. The method of claim 1 further comprising, determining skew-based cardinality of a busiest operator instance that depends on a number of partitions for a column of the database.

5. The method of claim 1 further comprising, using a regression model to determine cardinality of a busiest operator instance based on a maximum expected cardinality resulting from random variation alone to account for instances of statistical variation in a number of unique values assigned to each processor of the multiple processors.

6. The method of claim 1 further comprising, computing a cardinality of a busiest operator instance for input into a cost model of an optimizer.

7. A tangible computer readable storage medium having instructions for causing a computer to execute a method, comprising:
estimating skew to predict costs for query plans for a query in a database, wherein estimating the skew comprises traversing histogram intervals for partitioning columns of input data and identifying an interval with a most frequent value;
selecting a query plan that reduces the skew to uniformly distribute processing load among multiple processors; and
executing the query with the query plan with the multiple processors in a parallel processing architecture.

8. The tangible computer readable storage medium of claim 7 further comprising, determining a processor with a busiest operator that will dominate a proportion of the processing load allocated to the multiple processors to improve accuracy of evaluating the query plans.

9. The tangible computer readable storage medium of claim 7 further comprising, determining a cardinality of records expected to be processed by an operator instance and using the cardinality to estimate operator-costs for the query plans.

10. The tangible computer readable storage medium of claim 7 further comprising, using a Monte Carlo method to determine a predictive model that supports parallel processing.

11. The tangible computer readable storage medium of claim 7 further comprising, determining a ratio of a number of distinct values to a total number of parallel processors (D/P) to provide accurate query plan costing.

12. The tangible computer readable storage medium of claim 7 further comprising, using a query optimizer to detect in advance of query compilation degrees of potential work imbalances across the multiple processors that accrue from data value skew.

13. The tangible computer readable storage medium of claim 7 further comprising, determining a cardinality of a processor with a busiest operator to penalize the costs for the query plans to account for imbalance in workload apportionment across the multiple processors.

14. A computer system, comprising:
a database; and
a processor to:
determine skew to predict costs for query plans for a query of the database, wherein determining the skew comprises traversing histogram intervals for partitioning columns of input data and identifying an interval with a most frequent value;
select a query plan that accounts for the skew to evenly distribute processing load among multiple processors; and
execute the query with the query plan with the multiple processors.

15. The computer system of claim 14, wherein the processor further determines a cardinality of a processor with a busiest operator.

16. The computer system of claim 14, wherein the processor further uses histograms to compute derivative metrics for a query optimizer to assist in establishing an accurate query plan cost based on an expected cardinality of a busiest operator instance.

17. The computer system of claim 14, wherein the processor further estimates a number of participating records in the database having a busiest parallel processing stream to penalize a query plan cost to account for imbalances in workload apportionment across the multiple processors.

* * * * *